March 11, 1952 — R. B. GOCHENOUR ET AL — 2,588,716
PROCESS AND APPARATUS FOR THE IRRADIATION OF LIQUIDS
Filed Sept. 30, 1947
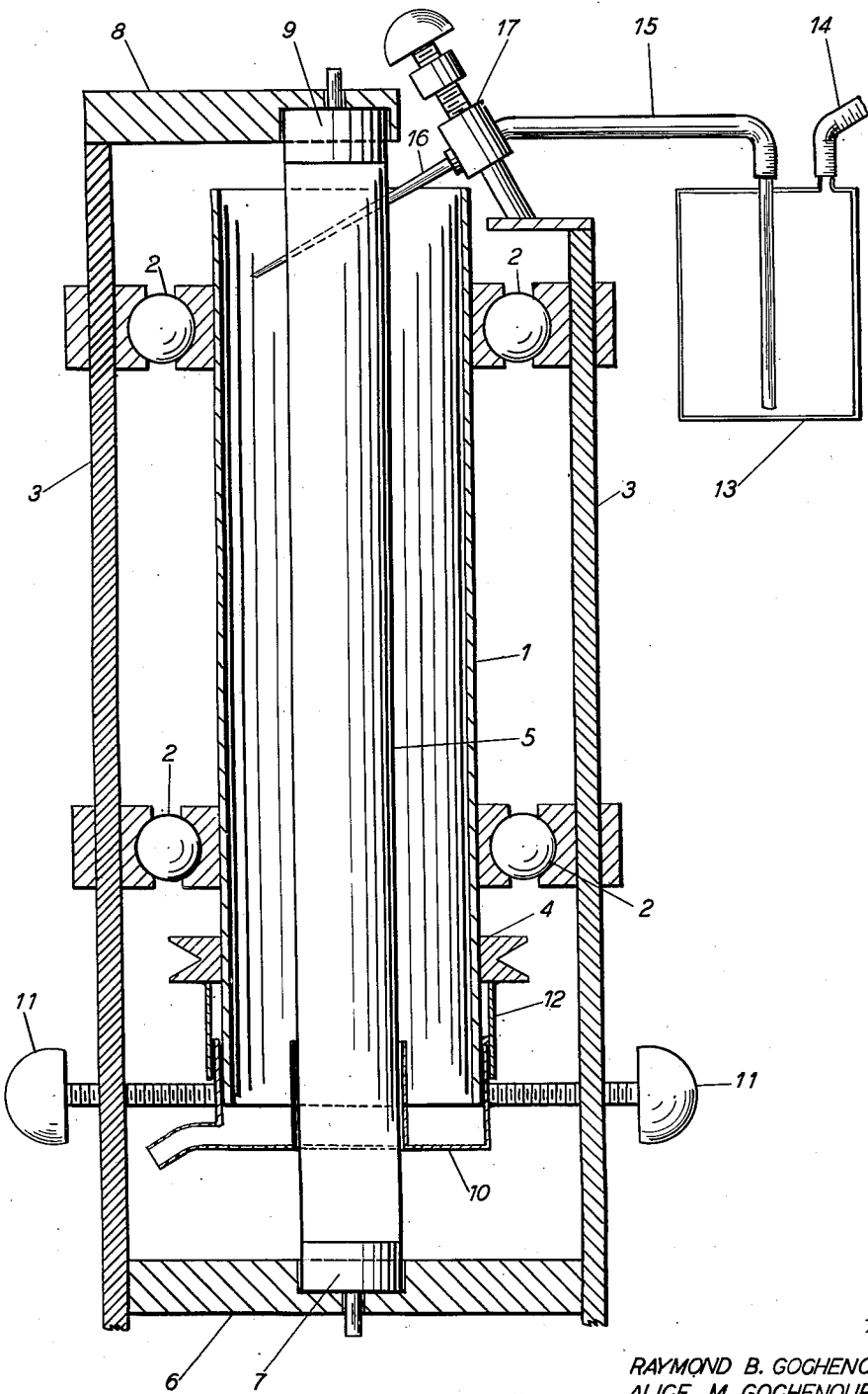
Inventors
RAYMOND B. GOCHENOUR
ALICE M. GOCHENOUR
By John W. Lee
Attorney Patented Mar. 11, 1952

2,588,716

UNITED STATES PATENT OFFICE 2,588,716

PROCESS AND APPARATUS FOR THE IRRADIATION OF LIQUIDS

Raymond B. Gochenour and Alice M. Gochenour, Indianapolis, Ind., assignors to Allied Laboratories, Inc., Kansas City, Mo., a corporation of Delaware Application September 30, 1947, Serial No. 776,946

11 Claims. (Cl. 250—49)

The present invention relates to the treatment of liquids with radiant energy. Particularly, it relates to a process and apparatus for producing a thin, continuously flowing film of a liquid and subjecting said film of liquid to the action of radiant energy. Still more particularly, it relates to the use of centrifugal force for producing a thin continuously flowing film of a liquid over a relatively large surface area and subjecting said film to the action of ultraviolet radiation.

In the past, it has been known that a thin film of liquid could be subjected to the action of ultraviolet radiation and that such treatment would kill the microorganisms and/or viruses present in the liquid. In spite of the fact that the sterilizing action of ultraviolet radiations on liquid food and medicinal substances is known, it has not been widely used commercially as is desired. One of the principal reasons for the apparent lack of wide commercial use of ultraviolet radiations for sterilizing liquids is the difficulty of producing films of the liquid substances thin enough to permit adequate penetration of the radiations. Another reason why the prior art conditions are not entirely satisfactory for volume production is that the quantity of liquid flowed in a thin film past an effective ultraviolet light source has been very limited. Of course, some are used in commercial processing operations but it is extremely desirable that the output and efficiency be increased.

In accordance with the present invention, we have provided a process and apparatus for more efficiently producing thin films of liquid while simultaneously subjecting said films to the action of radiant energy. Our improved apparatus utilizes a process never heretofore employed which broadly comprises a method of employing centrifugal force for maintaining a thin continuously flowing film of liquid and in such a manner that the thin film can be subjected to action of ultraviolet radiations to produce effective sterilization or killing of the microorganisms and/or viruses present in the liquid.

It is an advantage of this invention that an efficient process and a relatively inexpensive apparatus is provided for sterilizing or killing microorganisms and/or virus present in liquids.

It is also an advantage of this invention that relatively large volumes of liquid can be irradiated by our improved process in a relatively short period of time.

An additional advantage is that a new and improved process is provided for irradiating a wide variety of liquids.

A further advantage of the present invention is that it permits the utilization of the readily available low pressure resonance ultraviolet lamp.

An outstanding advantage of our invention is its usefulness for the commercial production of potent vaccines and antigens.

An additional outstanding advantage is its use for sterilizing antiserums, antitoxins, aggressins and other biological products.

A further outstanding advantage is that the surface on which the thin film of liquid is produced is sterilized by the ultraviolet radiations.

The above enumerated and other advantages of our invention will become apparent during the course of the following description.

The accompanying drawing illustrating our apparatus is a central vertical section of the apparatus.

As illustrated, the apparatus comprises a cylinder 1, which can be a stainless steel open ended tube about 30 inches long and about 2 inches in diameter, suspended by ball bearings 2 mounted on a supporting frame 3. The cylinder 1 also has mounted thereon a pulley 4 grooved for a V-belt so it can be driven by a constant speed motor (not shown) or other suitable source of power.

A 30 w. germicidal ultraviolet (commercially available) lamp 5 is positioned vertically inside the cylinder 1 and spaced so that the ultraviolet radiations are effectively transmitted to the inside cylinder wall. A lamp socket 7 is positioned in a support 6 in such a manner that when the lamp 5 is plugged in as shown, it is positioned axially to the cylinder 1. An upper lamp socket 9 is supported by a member 8 directly above the socket 7 and also in the vertical center of the cylinder 1. A support member 8 is removably attached to the frame support 3 in order that the lamp can be inserted in the lower socket 7 and then the member 8 and socket 9 placed in an operative position. Sockets 7 and 9 are connected to a constant electric power source (not shown). A liquid collecting cup 10 has an opening in the center thereof to permit the lamp 5 to pass through, an inner wall which extends some distance up and around the lamp 5 and an outer wall around the cylinder 1 being spaced therefrom and extending some distance up the wall of said cylinder. The conduit or space between the inner and outer walls of the cup 10 serves to collect liquid which can be discharged through the spout shown thereon. The cup 10 is held in the desired position by thumb screws 11 as illustrated. A cylindrical member 12 is attached to the lower side of the pulley 4 and extends over and around the outer wall of the collecting cup 10 to serve as a dust guard therefor.

A container 13 has an air inlet 14 and a liquid outlet tube 15. The liquid outlet tube 15 terminates with a liquid feed on needle 16, the terminal outlet of which is positioned near the inside wall of the cylinder 1. Hypodermic needles have been found to be satisfactory as feed on needles since the rate of liquid flow can be altered by simply using needles of different gauge. A support member 17 serves to support the liquid feed on needle 16 and permits adjustment thereof.

In utilizing our apparatus illustrated in the drawing, for carrying out our process the liquid to be irradiated is placed in the container 13 and the air inlet tube attached to a constant air pressure source and the liquid thus forced at a constant rate through the feed on device 16. The cylinder 1 is rotated at a constant speed by means of a constant speed motor through a V-belt around the pulley 4. The speed of rotation must be fast enough to centrifugally produce a thin film of the liquid along the inner wall. The ultraviolet lamp 5 having been previously positioned as shown in the drawing is connected with a constant electric power source as indicated. The inner wall of the cylinder is sterilized by the radiations prior to the introduction of the liquid. The previously sterilized liquid collecting cup 10 also is positioned as illustrated in the drawing.

The tip of the feed on needle 16 is positioned relative to the inner wall of cylinder 1 and direction of rotation so as to flow the liquid on to the cylinder without splashing. As the liquid is fed on to the inner wall of the rotating cylinder 1 it flows downward and because of the centrifugal force of the rotating cylinder forms a thin film of liquid over the entire inner surface of the cylinder. The thin film of liquid as it flows down the cylinder wall is subjected to the action of the radiations from the ultraviolet lamp 5. The irradiated liquid is collected in the liquid collecting cup 10 as it flows from the lower end of the cylinder and thence out the spout into a suitable receptacle. The upper open end of the rotating cylinder is protected from the atmosphere by a formalin soaked piece of gauze or other suitable means.

The following examples will serve to illustrate the present invention.

EXAMPLE I

*Sterilization of liquid suspension of E. coli*

A suspension of *E. coli* from a 24 hour growth on nutrient agar was adjusted to contain 300 million organisms per cc. as determined by plate count.

Approximately 600 cc. samples of the suspension were fed onto the inner wall of the 2 inch cylinder, through different gauge hypodermic needles while the cylinder was rotated at 1140 R. P. M. A constant pressure of 14.5 cm. of mercury was used to deliver the suspension to the cylinder and the speed of flow onto the cylinder being varied by using increasing sizes (gauges) of hypodermic needles at the outlet.

The 30 watt germicidal lamp located axially to the rotating cylinder furnished a constant source of ultraviolet radiations and by varying the rate of flow of the suspension, the time of irradiation was easily controlled.

The following table gives results obtained in a series of runs.

| Lot No. | Needle Gauge No. | Volume of Suspension, cc. | Total flow time, minutes | Rate of Flow, cc. per minute | Per Cent E. coli Killed |
|---|---|---|---|---|---|
| 1 | 24 | 600 | 40 | 15 | 100 |
| 2 | 22 | 625 | 23 | 27 | 100 |
| 3 | 20 | 625 | 12 | 52 | 100 |
| 4 | 18 | 620 | 7 | 89 | 100 |

It is obvious that at the rates of flow illustrated in the table the irradiated *E. coli* suspensions were completely sterilized. A further series of runs was made with the *E. coli* suspensions and it was found that the maximum speed of irradiation with the apparatus was approximately 250 cc. per minute.

EXAMPLE II

*Inactivation of rabies virus in goat brain tissue*

A 10% suspension of goat brain infected with rabies virus was made by mixing 388 gms. of brain with 3,492 cc. of physiological saline solution in a colloid mill. The resulting suspension was filtered through 325 mesh bolting silk to remove particulate matter. A sample was drawn and the presence of living virus demonstrated.

Several batches of the material were irradiated as described in Example I using 1140 R. P. M. for the cylinder speed and 13.9 cm. of pressure on the liquid. The rate of flow of the various batches was altered by using different gauge needles.

The results are summarized in the following table.

| Batch No. | Needle Gauge No. | Volume of Suspension, cc. | Total flow time, Minutes | Rate of Flow, cc. per minute | Degree of Inactivation |
|---|---|---|---|---|---|
| 1 | 24 | 600 | 51 | 12 | Complete. |
| 2 | 22 | 600 | 25.5 | 24 | Do. |
| 3 | 20 | 600 | 11 | 55 | Do. |
| 4 | 18 | 600 | 6 | 100 | Do. |
| 5 | 16 | 600 | 3.5 | 218 | Do. |

The virus in all of the irradiated samples was proven to be inactivated by inoculating mice intercerebrally with 0.03 cc. doses with no resulting deaths.

EXAMPLE III

*Inactivation of equine encephalomyelitis virus*

In similar experiments a total of about 800 cc. of equine encephalomyelitis virus 33½% chick embryo suspension was inactivated at 6, 26, 57 and 153 cc. per minute rates of flow respectively.

EXAMPLE IV

*Inactivation of mink distemper virus*

A total of about 1000 cc. of a 5% suspension of mink distemper virus infected ferret spleen was satisfactorily inactivated by irradiating at rates of flow of 100, 117 and 135 cc. per minute respectively.

EXAMPLE V

*Human rabies vaccine production*

365 grams of rabies infected rabbit brain tissue was ground in a colloid mill with 3285 cc. of physiological saline solution to give 10% tissue suspension and filtered through bolting silk. The suspension was irradiated at a rate of 133 cc. per minute using 14.5 cm. mercury pressure and an 18 gauge needle to regulate the flow.

The irradiated vaccine passed the standard sterility and potency tests, and was marketed as Human Rabies Vaccine Serial #212,013.

The following lots of Human Rabies Vaccine were all produced using different times of irradiation as indicated.

| Serial No. | Quantity, cc. | Irradiated at rate of flow, cc. per minute |
|---|---|---|
| 212,015 | 5,550 | 150 |
| 212,016 | 3,350 | 280 |
| 212,017 | 3,200 | 160 |
| 212,018 | 3,000 | 220 |
| 212,019 | 4,000 | 240 |
| 212,020 | 3,500 | 230 |
| 212,021 | 3,400 | 130 |
| 212,022 | 3,200 | 250 |

The above vaccines all passed the standard sterility and potency tests prescribed for commercial rabies vaccines.

EXAMPLE VI

*Sterilization of serums contaminated with bacteria*

The following commercial quantities of serums contaminated with bacteria of various kinds were successfully sterilized. The antigenicity of the serums was not impaired by treatment.

The rate of flow (i. e. time of irradiation) for each serum was determined by processing a small quantity and testing for sterility and activity after which the large quantity was processed. The time of irradiation varied with the different products as was expected, but in nearly all cases the time of irradiation could be varied considerably and good results still obtained.

1. Anti-swine erysipelas serum—632,000 cc.
2. Anti-hemorrhagic-septicemia serum, bovine origin—45,000 cc.
3. *Corynebacterium pasteurella-pseudodiphthericum*, bovine origin—88,000 cc.
4. Antibacterial serum canine, equine origin #2—91,000 cc.
5. Anti-bacterial serum equine, equine origin #1—18,000 cc.
6. Anthrax serum, bovine origin—70,000 cc.
7. Anthrax serum, equine origin—12,000 cc.
8. Anti-anthrax serum, bovine origin—32,000 cc.
9. Anti-equine encephalomyelitis serum, equine origin—18,000 cc.

EXAMPLE VII

*Sterilization of antigens*

The following commercial quantities of antigens contaminated with bacteria were successfully sterilized. In both cases, the antigens retained their full biologic values.

1. Tuberculin—16,900 cc.
2. Mallein—2,000 cc.

It is to be understood that the above examples are for illustrative purposes only and that the present invention is not limited thereto. In the specific examples, the apparatus employed comprised a rotatable stainless steel tube having a diameter of 2 inches and 30 inches long and a 30 w. germicidal lamp having a diameter of 1 inch and 36 inches long. Therefore, the distance the radiations traveled to contact the rotating inner wall of the cylinder was a constant and the time of irradiation was easily controlled by varying the rate of introduction of the liquid onto the cylinder wall.

The thickness of the liquid film was varied by varying the rate of introduction of the liquid onto the cylinder wall as well as by varying the speed of rotation of the cylinder from about 1140 to 1750 R. P. M.

The character of the liquid being irradiated determines to a large extent what conditions of irradiation must be used. A viscuous liquid would require introduction at a relatively slower rate than a non-viscuous one and a different speed of rotation of the cylinder in order to produce a continuous film of suitable thinness for irradiation. Liquids possessing biological activity as a general rule would require preliminary tests to determine the best condition for treatment of each substance. Relatively inert liquids contaminated with microorganisms could on the other hand perhaps be sterilized over a wider range of conditions.

The type of stainless steel cylinder employed is readily available commercially and is preferred but the cylinder could be composed of any other rigid substance such as, for example, aluminum, magnesium, glass, etc. Likewise, the diameter of the cylinder may be varied so long as the thin film of liquid is spaced an effective distance from the radiation source.

The 30 w. germicidal lamp 2537 A. unit wave length employed is likewise readily available and a preferred one. The 15 w. commercially available germicidal tubular lamps are also satisfactory. Our invention, however, may utilize radiations from any type source known to produce a desired effect on a liquid in the form of a thin film so long as it can be arranged relative to our centrifugally produced thin film of liquid to permit the radiation action to take effect on the liquid. For example, the lamp could be of the high pressure type ultraviolet emitting lamp. Radio active substances suitably positioned may also be employed.

The ultraviolet radiations of 2537 A. are preferred when we are concerned with inactivating, killing, attenuating or otherwise altering microorganisms or viruses such as in vaccine production. In other cases, we may use radiations of different A units for special purposes where such other A units are known to be particularly desirable. For example, in the production of vitamin D and in carrying out chemical reactions, we would use a radiation source having a high percentage of radiations in the desired range.

In our specific apparatus illustrated, the lamp is shown positioned inside and longitudinally (i. e. axially) to the rotatable cylinder and is our preferred arrangement. The cylinder may, however, be composed of a ray penetratable substance, i. e., cellulose acetate which permits penetration of ultraviolet radiations, and in which case the radiation source may be outside the rotatable cylinder. In certain instances, radiation sources may be located both inside and outside the ray penetratable cylinder.

In operation of our apparatus and process, the cylinder rotating at the relatively high rate of speed is air cooled and prevents the liquid from being overheated. In the case of solid substances which are stable to and liquified by heat, we may heat the cylinder to maintain a fluid condition during irradiation. It is obvious that we can thus easily control the temperature of the liquid being irradiated.

We have previously pointed out that the 2 inch diameter rotatable tube may be replaced by one of either a smaller or larger diameter so long as the ray source is positioned an effective distance from the thin film of liquid. In other instances a shorter tube may likewise be used to reduce the time of irradiation. To increase volume or time of irradiation, longer tubes or tubes in series may be employed. In the case of tubes having a very large diameter several of the 30 w. germicidal lamps may be arranged around the inner periphery of the tube and spaced an effective distance therefrom. Reflectors may be used to good advantage in some cases also.

It is apparent from the foregoing description and illustration that our process of utilizing centrifugal force for producing a thin film of liquid and especially a uniformly continuously flowing thin film of liquid while simultaneously subjecting said film to the action of radiations has real commercial merit and differs materially from the previously proposed processes.

What we claim is:

1. An apparatus for irradiating liquids with active rays comprising an essentially vertically disposed rotatable hollow cylinder, means for supplying a liquid to the upper internal surface of said cylinder, means for rotating said cylinder to centrifugally form a downward flowing thin film of said liquid on said surface, and active ray generating means positioned a uniform and effective distance from said film of liquid.

2. An apparatus for irradiating liquids with ultraviolet rays comprising an essentially vertically disposed rotatable tubular cylinder, means for supplying a liquid at a controlled rate to the upper internal surface of said cylinder, means for rotating said cylinder to centrifugally form a downward flowing thin film of said liquid on said surface, a tubular ultraviolet generating lamp positioned a uniform and effective distance from said thin film of liquid.

3. An apparatus for irradiating a liquid with ultraviolet rays comprising an essentially vertically disposed rotatable tubular cylinder, means for supplying a liquid at a controlled rate to the upper internal surface of said cylinder, means for rotating said cylinder to centrifugally form a downward flowing thin film of said liquid on said surface, a tubular ultraviolet generating lamp positioned axially in said cylinder and capable of uniformly and effectively irradiating said thin film of liquid.

4. Apparatus for irradiating a liquid with ultraviolet rays comprising an essentially vertically disposed rotatable tubular cylinder, means for supplying a liquid at a controlled rate to the upper internal surface of said cylinder, means for rotating said cylinder to centrifugally form a downward flowing thin film of said liquid on said surface, a tubular ultraviolet generating lamp positioned axially in said cylinder and capable of uniformly and effectively irradiating said thin film of liquid, and means for sterile collecting of the irradiated liquid at the lower end of the vertical cylinder.

5. In a process for irradiating biologically active liquids, the improvement which comprises introducing the liquid at a controlled rate onto the upper inner surface of a rapidly rotating vertically disposed cylinder, whereby a thin downwardly flowing liquid film of substantially uniform thickness is produced on the inner wall of said cylinder and treating said film with ultraviolet radiations for a sufficient period of time and intensity to effectively sterilize said biologically active liquid without adversely altering its antigenic properties.

6. In a process for irradiating liquid suspensions of micro-organisms with ultraviolet radiations, the improvement which comprises introducing the liquid in a thin stream and at a controlled rate onto the upper inside wall of a vertically disposed cylinder while said cylinder is being rotated to centrifugally produce a thin downwardly flowing film of liquid of substantially uniform thickness on the inner wall of said cylinder and treating said downwardly flowing film with ultraviolet radiations generated co-axially to the flowing film, said irradiation being carried out for a sufficient period of time and intensity to inactivate the micro-organisms without adversely altering their antigenic properties.

7. In a process for producing vaccines by ultraviolet irradiation, the improvement which comprises flowing a virus bearing liquid at a controlled rate onto the upper inner surface of a rapidly rotating vertically disposed cylinder, whereby a thin downwardly flowing liquid film of substantially uniform thickness is produced on the inner wall of said cylinder and treating said film with ultraviolet radiations for a sufficient period of time and intensity to effectively inactivate the virus without adversely altering its antigenic properties to produce a potent vaccine.

8. In a process for producing vaccines by ultraviolet irradiation, the improvement which comprises introducing a virus bearing liquid in a thin stream and at a controlled rate onto the upper inside wall of a vertically disposed cylinder while said cylinder is being rotated to centrifugally produce a thin downwardly flowing film of liquid of substantially uniform thickness on the inner wall of said cylinder and treating said downwardly flowing film with ultraviolet rays generated co-axially to the flowing film, said irradiation being carried out for a sufficient period of time and intensity to inactivate the virus without adversely altering its antigenic properties to produce a potent vaccine.

9. In a process for producing rabies vaccine by ultraviolet irradiation, the improvement which comprises introducing a rabies virus bearing liquid in a thin stream and at a controlled rate onto the upper inside wall of a vertically disposed cylinder while said cylinder is being rotated to centrifugally produce a thin downwardly flowing film of liquid of substantially uniform thickness on the inner wall of said cylinder and treating said downwardly flowing film with ultraviolet radiations of essentially 2537 A., generated co-axially to the flowing film, said irradiation being carried out for a sufficient period of time and intensity to inactivate said rabies virus without altering its antigenic properties to produce a potent vaccine.

10. An apparatus for irradiating liquids with active rays comprising a rotatable hollow cylinder disposed with respect to the vertical to provide for gravity induced liquid flow from the upper internal surface thereof to the lower internal surface thereof, means for supplying a liquid to the upper internal surface of said cylinder, means for rotating said cylinder about its own longitudinal axis to centrifugally form a downward flowing thin film of said liquid on said surface, and active ray generating means positioned a uniform and effective distance from said film of liquid.

11. In a process for irradiating liquids with active rays, the improvement which comprises flowing the liquid at a controlled rate onto the inner surface and adjacent the upper end of a cylinder which is disposed with respect to the vertical to provide for gravity induced flow of the liquid from the upper end of the cylinder to the lower end of the cylinder, rapidly rotating said cylinder about its own longitudinal axis to subject said liquid to centrifugal force and thereby produce a thin downwardly flowing film of substantially uniform thickness within said cylinder, and treating said downwardly flowing film with active rays.

RAYMOND B. GOCHENOUR.
ALICE M. GOCHENOUR.

REFERENCES CITED

The following references are of record in the file of this patent:

UNITED STATES PATENTS

| Number | Name | Date |
|---|---|---|
| 2,072,417 | Berndt et al. | Mar. 2, 1937 |
| 2,308,516 | Knott | Jan. 19, 1943 |
| 2,421,382 | Levinson et al. | June 3, 1947 |